United States Patent [19]
Gorzalski et al.

[11] Patent Number: 5,585,415
[45] Date of Patent: Dec. 17, 1996

[54] PIGMENTED COMPOSITIONS AND METHODS FOR PRODUCING RADIATION CURABLE COATINGS OF VERY LOW GLOSS

[75] Inventors: Peter J. Gorzalski, Racine County, Wis.; David A. Diehl, Ross Twp., Pa.

[73] Assignee: PPG Industries, Inc., Pittsburgh, Pa.

[21] Appl. No.: 338,077

[22] Filed: Nov. 14, 1994

Related U.S. Application Data

[63] Continuation-in-part of Ser. No. 953,337, Sep. 30, 1992, abandoned.

[51] Int. Cl.$^6$ .................... C08F 2/50; C08J 3/28; C08K 3/22; C08K 5/00
[52] U.S. Cl. .................... 522/18; 522/75; 522/81; 522/79; 522/182
[58] Field of Search .................... 522/64, 18, 81, 522/43, 44, 75, 79, 182; 52/18, 43, 44, 64, 81

[56] References Cited

U.S. PATENT DOCUMENTS

| | | | |
|---|---|---|---|
| 3,645,984 | 2/1972 | Dowbenko et al. | 260/78.4 |
| 3,668,093 | 6/1972 | Rettig | 204/159.23 |
| 3,783,004 | 1/1974 | Parker | 117/93.31 |
| 3,840,448 | 10/1974 | Osborn et al. | 204/159.14 |
| 3,918,393 | 11/1975 | Hahn | 427/38 |
| 4,017,652 | 4/1977 | Gruber | 427/54 |
| 4,048,036 | 9/1977 | Prucnal | 204/159.15 |
| 4,229,274 | 10/1980 | Carlblom | 204/159.15 |
| 4,292,152 | 9/1981 | Lechtken et al. | 204/159.15 |
| 4,385,109 | 5/1983 | Lechtken et al. | 430/306 |
| 4,411,931 | 10/1983 | Duong | 427/54.1 |
| 4,421,784 | 12/1983 | Troue | 427/54.1 |
| 4,447,520 | 5/1984 | Henne et al. | 430/281 |
| 4,483,884 | 11/1984 | Troue | 427/54.1 |
| 4,485,123 | 11/1984 | Troue | 427/54.1 |
| 4,710,523 | 12/1987 | Lechtken et al. | 522/14 |
| 4,721,734 | 1/1988 | Gehlhaus et al. | 522/8 |
| 4,985,472 | 1/1991 | Aosai et al. | 522/63 |
| 5,013,768 | 5/1991 | Kuriyama et al. | 522/64 |

FOREIGN PATENT DOCUMENTS

| | | |
|---|---|---|
| 059988 | 7/1979 | European Pat. Off. . |
| 386650 | 3/1990 | European Pat. Off. . |
| 402932 | 6/1990 | European Pat. Off. . |

OTHER PUBLICATIONS

Luciano Giono Mariera et al., "Pigmented High Thickness Coatings", Proc. Radtech Europe 89, Florence 1989, pp. 107–119.

James R. Freid, "Gloss–Reduction Mechanisms of Radiation Cure Coatings", Radiation Curing, Feb. 1982, pp. 19–25.

Primary Examiner—Susan W. Berman
Attorney, Agent, or Firm—Dennis G. Millman; Paul S. Chirgott

[57] ABSTRACT

Very low gloss finishes are attained in pigmented, radiation curable coatings by inclusion of a combination of photoinitiators having an acylphosphine oxide photoinitiator and a second photoinitiator such as an acetophenone derivative. In the method of producing the low gloss finishes, the coating is first exposed to ionizing radiation (e.g., electron beam) in air, then exposed to actinic radiation (ultraviolet light) in an essentially inert atmosphere. The low gloss is achieved by a fine, uniform surface wrinkling effect.

11 Claims, 1 Drawing Sheet

FIG. 1

PIGMENTED COMPOSITIONS AND METHODS FOR PRODUCING RADIATION CURABLE COATINGS OF VERY LOW GLOSS

RELATED APPLICATION

This application is a continuation-in-part of U.S. patent application Ser. No 07/953,337, filed Sep. 30, 1992 now abandoned.

BACKGROUND OF THE INVENTION

Most radiation curable coating compositions, when exposed to ultraviolet light or electron beam, are cured to glossy, crosslinked coatings. In many instances, however, it is desired to obtain crosslinked coatings of low gloss. One way to achieve low gloss coatings is by adding flatting pigment. Unfortunately, when the amount of flatting pigment is increased to the extent required to produce coatings of very low gloss, the pigment to binder ratio may be so high that there is insufficient binder to firmly hold the pigment. The result is a low gloss coating which lacks hardness and durability. Also, high pigment to binder ratios may increase viscosity of the coating composition to such an extent that application onto a substrate may be hindered.

Another method heretofore employed to produce low gloss films from radiation curable compositions utilized a two step curing process wherein polymerization of certain coating compositions was inhibited in surface portions in the first step by the presence of oxygen (air), and curing of the coating was completed in the second step in an inert atmosphere. Shrinkage of underlying layers during the first step caused pigment particles to be driven into the surface portions, whereby the surface contained a larger amount of pigment than the body of the film which reduced the gloss of the film without sacrificing film strength or rheology properties of the coating composition. U.S. Pat. Nos. 3,918,393 (Hahn) and 4,048,036 (Prucnal) illustrate this approach. A drawback to the approach of concentrating flatting pigments at the surface of the film is that the surface is subject to physical damage that causes unattractive marking of the surface. One form of physical damage is burnishing, that is, the pigment particles can be abraded from the surface, thereby producing an area of higher gloss and creating a non-uniform finish appearance. Another form of damage to which these types of low gloss coatings are susceptible is metal marking, whereby contact of certain metals with the surface causes dark markings. It would be desirable to avoid these problems with radiation curable low gloss coatings as well as to be able to produce coatings of even lower gloss than prior art methods.

Multi-step radiation curing techniques have also been proposed for producing textured finishes. These techniques are disclosed in U.S. Pat. Nos. 4,421,784 (Troue), 3,840,448 (Osborne et al.), and 4,411,931 (Duong). The methods of these patents do not appear to be intended to produce the type of flat, low gloss finishes that are the subject of this invention, but are directed to the production of relatively gross, visibly perceivable, surface wrinkle patterns. These patented methods do not involve the use of electron beam radiation.

Prior art techniques for producing low gloss or textured radiation cured coatings, including the patents set forth above, have generally been limited to non-pigmented coatings. Typically the low gloss or textured coating is a clear coating that is applied over a pigmented base coat. This has generally been considered necessary in order to assure adequate penetration of radiation during the curing step. It would be highly desirable to produce low gloss coatings by radiation curing directly from pigmented coating compositions.

Commercially available photoinitiators such as 2-chlorothioxanthone are capable of producing low gloss pigmented coatings, but have the undesirable drawback of yielding reaction by-products that impart yellow coloration to the cured coating. This causes uncontrolled color shifting, which is particularly objectionable in white or other light colored coatings.

SUMMARY OF THE INVENTION

This invention provides a pigmented, radiation curable coating composition adapted to produce a low gloss film in the substantial absence of flatting agents. The composition comprises: a resin binder curable by radiation exposure in the presence of at least one photoinitiator compound, the resin being selected from those whose curing by radiation exposure is substantially inhibited by the presence of oxygen; a first photoinitiator compound comprising an acylphosphine oxide; a second photoinitiator; and pigment. Resins suitable for use in the present are characterized by average molecular weight less than 500, preferably less than 400. The binder resins of the present invention are also characterized by the presence of less than an average of three crosslinking groups per molecule. Most preferred are compounds having average functionality of about 2.

It is an advantage of the present invention that the coating composition is pigmented, whereby the desired low gloss finish can be attained with one coat rather than requiring a base coat and clear top coat as required by some prior art methods. Because the present invention does not rely on the use of flatting agents, the problems of burnishing and metal marking are avoided. Low gloss is achieved in the present invention by means of a uniform, microscopic surface wrinkling of the film that is produced from the coating composition.

Another aspect of the invention is the method of using the novel coating composition described above wherein the coating composition is cured in a subsurface portion in a first step by electron beam radiation in the presence of oxygen whereby curing at the surface is inhibited. In a subsequent step the curing is completed by means of ultraviolet radiation in a substantially inert atmosphere. During the ultraviolet curing step, the first photoinitiator (acylphosphine oxide) initiates curing in subsurface layers of the remaining uncured coating layer, and the second photoinitiator, which is characterized by the ability to absorb radiation strongly at shorter wavelengths than the acylphosphine oxide, serves to initiate curing of surface portions of the coating.

Since, unlike some prior art approaches, the present invention does not entail migration of pigment particles toward the surface of the coating, the coating composition of the invention does not require as much solvent to be present as in prior art compositions of this type. Therefore, an additional advantage of the composition of the present invention is that it may have a relatively high solids content and therefore a low volatile organic compound content. In preferred embodiments, the composition contains substantially no volatile organic solvent (i.e., the compositions are essentially free of organic solvents).

DETAILED DESCRIPTION

The present invention involves a coating composition containing a combination of photoinitiators. Photoinitiators absorb radiation and thereby obtain energy to form free radicals that initiate polymerization of the binder resin. The photoinitiator selected for use as the first photoinitiator of the present invention is one which forms free radicals upon exposure to actinic radiation, viz., ultraviolet light. A particularly suitable class of photoinitiators for this purpose are the acylphosphine oxides. These photoinitiators cleave when exposed to ultraviolet radiation, and their residues in the cured film advantageously do not impart unwanted coloration to the film. Relative to the second photoinitiator used in the composition of the present invention, acylphosphine oxides tend to absorb energy at relatively long wavelengths in the ultraviolet region of the spectrum, thereby rendering them effective for initiating polymerization in portions of the coating removed from the outer surface of the coating. The acylphosphine oxides are also particularly suitable for use in combination with titanium dioxide pigment, which is commonly included in many embodiments of low gloss coatings, particularly light colored coatings. Acylphosphine oxide photoinitiators are disclosed in U.S. Pat. Nos. 3,668,093 and 4,447,520 and may be characterized by the formula:

where R and R' may be linear or branched 1 to 6 carbon alkyl, cyclohexyl, cyclopentyl, aryl, halogen-, alkyl-, or alkoxy-substituted aryl, or 5- or 6-membered S- or N-heterocyclic groups; R' may additionally be 1 to 6 carbon alkoxy, aryloxy, or arylalkoxy, or forms a ring with R; R" is linear or branched 2 to 18 carbon alkyl, a 3 to 12 carbon cycloaliphatic group, an alkyl- or (thio)alkoxy-substituted phenyl or naphthyl group, or a 5- or 6-membered S- or N-heterocyclic group which can contain other functional groups, or an —X—CO—P(=O)R—R' group (where X is a phenylene or 2 to 6 carbon (cyclo)aliphatic divalent group. R, R', or R" may include unsaturation. A particular example of an acylphosphine oxide is 2,4,6-trimethyl benzoyl diphenyl phosphine oxide, which is sold under the name "Lucirin® TPO" by BASF Corporation. In selecting photoinitiators, one of skill in the art would consider it expedient to select compounds that are soluble and stabile in the particular composition.

There are many photoinitiators which may be used in the present invention as the second photoinitiator. In general, the second photoinitiator differs from the acylphosphine oxide in its activation mechanism so as to serve to a greater extent to initiate rapid curing in portions of the coating at or near the outer surface. In particular, the second photoinitiator may absorb actinic radiation (viz., ultraviolet radiation) at relatively short wavelengths in the ultraviolet portion of the spectrum, thereby providing rapid curing at the surface. A preferred class of compounds useful as the second photoinitiator are acetophenone derivatives, but it should be understood that the invention is not limited to acetophenone photoinitiators.

Many acetophenone derivatives are known as photoinitiators, a large number of which are disclosed in U.S. Pat. No. 4,229,274 (Carlblom), and lend themselves to use as the second photoinitiator in the present invention. Acetophenone derivative photoinitiators may be generally characterized by the formula:

where $R^1$, $R^2$, and $R^3$ may, for example, include independently hydrogen, alkyl usually having from 1 to 6 carbon atoms (preferably 1 to 4 carbon atoms), alkoxy, cycloalkyl, or substituted or unsubstituted phenyl groups, and Φ is a phenyl group.

A particularly useful family of acetophenone derivatives for use as the second photoinitiator in the present invention has the following structure:

where $R^4$ and $R^5$ are alkyl groups having from 1 to 4 carbon atoms, and Φ is a phenyl group. Examples are a,a-dimethyl-a-hydroxyacetophenone sold under the name "DAROCUR® 1173" by EM Chemicals, Elmsford, N.Y., U.S.A., and P-isopropyl-a,a-dimethyl-a-hydroxyacetophenone.

The amount of acylphosphine oxide photoinitiator present in the coating composition is preferably at least 0.01 weight percent based on total solids content of the coating composition. Although larger amounts could be used, it is usually uneconomical to use more than 2 percent acylphosphine oxide. Typically, the acylphosphine oxide is present in the white pigmented compositions of the present invention in amounts of at least 0.1 weight percent, preferably 0.3 to 0.7 weight percent. The second photoinitiator (e.g., acetophenone derivative) may be present in an amount in the range of from 0.01 percent to 4 percent by weight based on total solids content of the coating composition, preferably at least 0.1 percent for white pigmented compositions, most often in the range of from 0.5 percent to 2 percent. If more acylphosphine oxide is present than acetophenone, the desired low gloss finish may not be achieved. Therefore, it is preferred that the weight ratio of acylphosphine oxide to the second photoinitiator be no greater than 1:1, preferably less than 0.5:1 (for white pigmented compositions), but no less than 0.05:1, preferably no less than 0.1:1 (for white pigmented compositions).

The binder or vehicle in the coating composition of the present invention comprises at least one resin (monomer, oligomer, or polymer) including at least one compound which is curable by exposure to radiation in the presence of one or more of the photoinitiators disclosed above. The resins suitable for use in the present invention are characterized by inhibition of curing by the presence of oxygen (such as in air). Oxygen inhibition permits maintaining an uncured surface layer during the initial curing step, which is important for attaining the wrinkle effect of the present invention. Therefore, radiation curable resins that are adapted to be curable in the presence of oxygen, such as those containing substantial amounts of epoxy acrylate derivatives or allyl groups, are not appropriate for use in the present invention. Resins suitable for use in the present invention have also been found to be characterized by average molecular weight less than 500 preferably less than 400. Higher molecular weights have been found to inhibit the surface wrinkling effect that is desired. Particularly good results have been attained with molecular weight around 300. Molecular weights below 200 may not provide sufficient viscosity for application purposes unless the coating composition includes auxiliary thickening agents. The binder resins of the present invention are also characterized by the presence of less than an average of three crosslinking groups per molecule, expressed herein as having functionality less than 3.0. Preferably, at least 90 percent by weight of the resin comprising the binder is characterized by an average molecular weight of less than 500 and an average crosslinking functionality of less than 3.0. Most preferred are compounds having average functionality of about 2. Expressed differently, the preferred resin binders of the present invention are comprised chiefly of compounds having functional group equivalent weight of less than and at least 100.

A particular category of radiation curable compounds useful in the present invention as the principal component of the binder are characterized by a plurality of acrylyloxy groups and the ability to be polymerized by free radical addition initiated by the photoinitiators. There are numerous compounds that are thus characterized. A preferred group includes divalent organic radicals whose bonds are satisfied with unsubstituted acrylyloxy or m-substituted acrylyloxy groups. The divalent radical may be aliphatic, cycloaliphatic, aromatic or other, and may be selected from alkyl, polyether, polyester, polyaromatic, polycarbonate, or polyacrylate radicals. As used herein, unless otherwise indicated either directly or by context, acrylyloxy is used in its broad sense to mean unsubstituted acrylyloxy or α-substituted acrylyloxy groups such as methacrylyloxy, ethacrylyloxy and α-chloroacrylyloxy. Similarly, unless otherwise indicated either directly or by context, acrylic unsaturation is used in its broad sense to mean the unsaturation provided by unsubstituted acrylyl groups or a-substituted acrylyl groups such as methacrylyl, ethacrylyl and a-chloroacrylyl. Examples of these compounds are the diacrylates and dimethacrylates of ethylene glycol, 1,3-propanediol, propylene glycol, 2,3-butanediol, 1,4-butanediol, 2-ethylbutane-1,4-diol, 1,5-pentanediol, 1,6-hexanediol, 1,7-heptanediol, 1,8-octanediol, 1,9-nonanediol, 1,10-decanediol, 2,10-decanediol, 1,4-cyclohexanediol, 1,4-dimethylolcyclohexane, 2,2-diethylpropane-1,3-diol, 2,2-dimethylpropane-1,3-diol, 3-methylpentane-1,4-diol, 2,2-diethylbutane-1,3-diol, 4,5-nonanediol, diethylene glycol, triethylene glycol, propylene glycol, neopentyl glycol, 5,5-dimethyl-3,7-dioxanonane-1,9-diol, 2,2-dimethyl-3-hydroxypropyl-2,2-dimethyl-3-hydroxypropionate, glycerol, 1,1,1-trimethylolpropane, trimethylolethane, pentaerythritol and erythritol. The acrylyloxy groups in each of the molecules are usually the same, but they may be different as exemplified by the compound 2,2-dimethyl-1-acrylyloxy-3-methacrylyloxypropane.

Further examples of polyacrylyloxy compounds that may be included in the radiation curable resin include polyacrylyloxy functional polyesters, polyamides, polyacrylates, polyethers, polycarbonates or polyurethanes as well as polyacrylyloxy functional compounds of mixed functionality such as polyacrylyloxy functional poly(ester-urethanes), poly(ester-amides) and poly(ether-urethanes). It should be understood that these polymeric resins may comprise the principal portion of the binder resin only if they meet the molecular weight and functionality requirement described above. Mixtures of compounds having a plurality of acrylyloxy groups may be used, if desired.

Binder may constitute 10 to 99, preferably 50 to 99, percent by weight of the total coating composition. The amount of radiation polymerizable compound having a plurality of acrylyloxy groups present in the binder resin is also subject to variation. The compound or compounds are ordinarily present in an amount in the range of from about 10 to 99 percent by weight based on the weight of the binder of the coating composition. An amount in the range of from about 20 to 97 percent is typical. In one preferred embodiment, at least 30 percent of the binder is a polyacrylyloxy compound. From about 30 to 95 percent by weight of the binder is preferred. Although the binder of the present invention is characterized by an average crosslinking functionality of less than three, it may contain minor amounts up to about 10 weight percent of the binder) of compounds having a functionality of three or greater. Similar amounts of resin outside the molecular weight limitations of the present invention may be included without significant detrimental effect. Monomers having mono-functionality may also be included the binder. When used, the mono-functional monomer will ordinarily be present in the coating composition in the range of from about 0 to about 80 percent by weight of the binder of the coating composition. Typically, the mono-functional monomer will be present in the range of from about 0 to about 30 percent by weight of the binder.

Examples of monoacrylic functional monomers which may optionally be included in the binder are methyl acrylate, methyl methacrylate, ethyl acrylate, ethyl methacrylate, propyl acrylate, propyl methacrylate, butyl acrylate, butyl methacrylate, hexyl acrylate, hexyl methacrylate, hexyl ethyl acrylate, hexyl butyl acrylate, 2-ethyl hydroxy acrylate, octyl acrylate, octyl methacrylate, hydroxy ethyl acrylate, hydroxy butyl acrylate, caprolactone-hydroxyl alkyl acrylate reaction products, and 2-ethyl hydroxy acrylate. The preferred monoacrylic functional monomers are liquid compounds miscible with the polyacrylyloxy compound. A benefit from the use of one or more monoacrylic functional monomers is that the monoacrylic functional monomer may act as a reactive solvent for the polyacrylyloxy functional compound, thereby providing coating compositions having a satisfactory low viscosity without using relatively small amounts or no volatile, nonreactive solvent. The amount of such monomer when used should be sufficient to provide a liquid, flowable, interpolymerizable mixture. Other monovalent functional monomers may be employed as known in the radiation curing art, including N-vinyl-2-pyrolidone, vinyl neodecanoate, and other ethylenic unsaturated monomers known to be suitable for radiation curable coatings.

Pigments may be included in the coating composition. Examples of opacifying pigments include titanium dioxide (rutile or anatase), zinc oxide, zirconium oxide, zinc sulfide and lithopone. Examples of coloring pigments include iron oxides, cadmium sulfide, carbon black, phthalocyanine blue, phthalocyanine green, indanthrone blue, ultramarine blue, chromium oxide, burnt umber, benzidine yellow, tolluidine red, aluminum power and aluminum flakes. Examples of extender pigments include silica, barytes, calcium carbonate, barium sulfate, talc, aluminum silicates, sodium aluminum silicates, potassium aluminum silicates and magnesium silicate. A single pigment may be used or mixtures of pigments may be employed. When the pigment is ultraviolet light absorbing, it should be used in amounts which do not preclude curing of the interior of the coating. The maximum amount is therefore related to the thickness of the coating to be cured. Thin coatings may tolerate more ultraviolet light absorbing pigment than thick coatings. When the pigment does not significantly absorb ultraviolet light, there is usually greater latitude in the amounts which may be employed. When pigment is used, it is generally present in an amount in the range of from about 0.1 to about 70 percent by weight of the coating composition. Often it is present in an amount in the range of from about 0.5 to about 50 percent. Usually it is present in an amount in the range of from about 1 to about 35 percent by weight of the coating composition. Dyes and tints may optionally be included in the coating composition as replacements for all or some of the pigment content.

Another optional ingredient is resinous pigment dispersant, viscosity control agent (e.g., cellulose acetate butyrate), or grinding vehicle. There are many resinous dispersants which are commercially available which may be used for that purpose. These dispersants are used in the manner and in amounts known to the art, such as 0 to 20 weight percent of the total composition.

Conventional plasticizers such as dibutyl phthalate, butyl benzyl phthalate, diisooctyl phthalate, decyl butyl phthalate, diisooctyl adipate, dibutyl sebacate, butyl benzoate, triisooctyl trimellitate, n-octyl n-decyl trimellitate, and tricresyl phosphates and flow promoters such as phenyl benzoate, dibenzyl ketone, benzyl methyl ketone and the like may also be optionally included in amounts customary in the art, although they are not considered necessary for the present invention. If any plasticizer is included, it is usually present in amounts no greater than 5 weight percent of the total composition.

Another ingredient which is often included in coating compositions of this type is a non-reactive, volatile organic solvent. However, in preferred embodiments of the present invention, no such non-reactive solvent need be included. In other embodiments of the invention, solvent may be present, but in lesser amounts than conventional. It is generally advantageous to minimize the amount of organic solvent, but if reduction of viscosity is desired for a particular application, the present invention does not preclude adding larger amounts of a non-reactive solvent or mixtures of several solvents. Examples of suitable non-reactive organic solvents are acetone, methyl ethyl ketone, methyl isobutyl ketone, methyl alcohol, ethyl alcohol, propyl alcohol, isopropyl alcohol, butyl alcohol, secutyl alcohol, isobutyl alcohol, tert-butyl alcohol, amyl alcohol, hexyl alcohol, 2-ethylhexyl alcohol, cellosolve, ethyl cellosolve, cellosolve acetate, 2-ethylhexyl acetate, tetrahydrofuran, and aliphatic naphtha. When solvent of this type is used it is ordinarily present in the coating composition in the range of from about 0.1 to about 40 percent by weight of the vehicle of the coating composition. From about 0 to about 15 percent is typical. The preferred compositions are solvent-free.

The listing of optional ingredients discussed above is by no means exhaustive. Other ingredients may be employed in their customary amounts for their customary purposes so long as they do not seriously interfere with good coatings practice or the obtaining of cured coatings of low gloss.

The coating compositions of the invention are usually prepared by simply admixing the various ingredients. The compounds comprising the photocatalyst system may be premixed and then admixed with the other ingredients of the coating composition or they may be added separately. Although mixing is usually accomplished at room temperature, elevated temperatures are sometimes used. The maximum temperature which is usable depends upon the heat stability of the ingredients. Temperatures above about 200° F. (93° C.) are only rarely employed.

The radiation curable coating compositions of the invention are generally used to form cured adherent coatings on substrates. The substrate is coated with the coating composition using substantially any technique known to the art. These include spraying, curtain coating, dipping, roller application, printing, brushing, drawing and extrusion. The coated substrate is then exposed to ultraviolet light to cure the coating into a crosslinked film.

Wet, uncured coatings as applied to a substrate have thicknesses of at least 1.0 mil (0.025 millimeter), preferably at least 2.5 mils (0.635 millimeters), in order to achieve the low gloss effect of the present invention. Theoretically there is no upper limit for wet coating thickness, but in order to effect first stage curing of lower strata at practical radiation power levels, it is expedient to limit coating thickness to 5 to 8 mils (0.137 to 0.20 millimeters). Cured coatings of the ultraviolet light curable coating composition of the invention usually have thicknesses in the range of from 0.1 to 5 mils (0.0025 to 0.13 millimeter). More often they have thicknesses in the range of from 0.3 to 5 mils (0.007 to 0.13 millimeter).

Substrates which may be coated with the compositions of this invention may vary widely in their properties. Organic substrates such as wood, fiberboard, particle board, composition board, paper, cardboard and various polymers such as polyesters, polyamides, cured phenolic resins, cured aminoplasts, acrylics, polyurethanes and rubber may be used. Inorganic substrates are exemplified by glass, quartz and ceramic materials. Many metallic substrates may be coated. Exemplary metallic substrates are iron, steel, stainless steel, copper, brass, bronze, aluminum, magnesium, titanium, nickel, chromium, zinc and alloys.

The method of curing the coating composition of the present invention involves a two step radiation exposure wherein the applied coating layer is cured in a subsurface portion in a first step by exposure to ionizing radiation (e.g., electron beam radiation or laser) in the presence of oxygen whereby curing at the surface is inhibited. In a subsequent step the curing is completed throughout the remainder of the coating thickness by means of ultraviolet radiation in a substantially inert atmosphere.

Suitable electron beam radiation for use in the first curing step may constitute a dose of 2 to 10 megarads, preferably 2 to 5 megarads, at 150 to 300 kiloelectron volts, preferably 170 to 250 kiloelectron volts. The exposure in the first step is chosen so as to substantially cure the portion of the coating closest to the substrate. A portion of the coating thickness nearest to the surface will remain uncured due to oxygen inhibition. The uncured portion at the end of the fist curing step typically constitutes 15 to 60 percent of the original wet coating thickness.

Any suitable source which emits ultraviolet light, viz., electromagnetic radiation having a wavelength in the range of from about 180 to about 400 nanometers, may be used in the practice of the second curing step. Suitable sources are mercury arcs, carbon arcs, low pressure mercury lamps, medium pressure mercury lamps, high pressure mercury lamps, swirl-flow plasma arc, ultraviolet light-emitting diodes and ultraviolet light emitting lasers. Particularly preferred are ultraviolet light emitting lamps of the medium or high pressure mercury vapor type. Such lamps usually have fused quartz envelopes to withstand the heat and transmit the ultraviolet radiation and are ordinarily in the form of long tubes having an electrode at either end.

The time of exposure to ultraviolet light and the intensity of the ultraviolet light to which the coating composition is exposed may vary greatly. Generally the exposure to ultraviolet light should continue until either the film is thermoset throughout or at least cured to the point where subsequent reactions cause the film to become thermoset throughout. Exposure of the coating to ultraviolet light may be accomplished in the presence of an inert atmosphere, viz., an atmosphere either containing no oxygen or only a concentration of oxygen which insignificantly inhibits polymerization of the coating surface (less than 500 parts per million oxygen). Gases such as nitrogen, argon, carbon dioxide or mixtures thereof are typically the major components of inert atmospheres, although other unreactive gases may be used Nitrogen is generally employed for this purpose.

Optionally, an intermediate exposure step may be employed following the ionizing radiation (electron beam) exposure step and the actinic radiation (ultraviolet) step described above. The intermediate step may comprise exposure to actinic radiation (e.g., ultraviolet) in the presence of air so as to reduce the thickness of the uncured wet layer below the surface before the final surface curing step. It has been found that in some cases this intermediate curing step improves the uniformity of the surface wrinkle pattern. The ultraviolet lamps used for the intermediate step may be the same as for the final step as described above.

Figure 1:
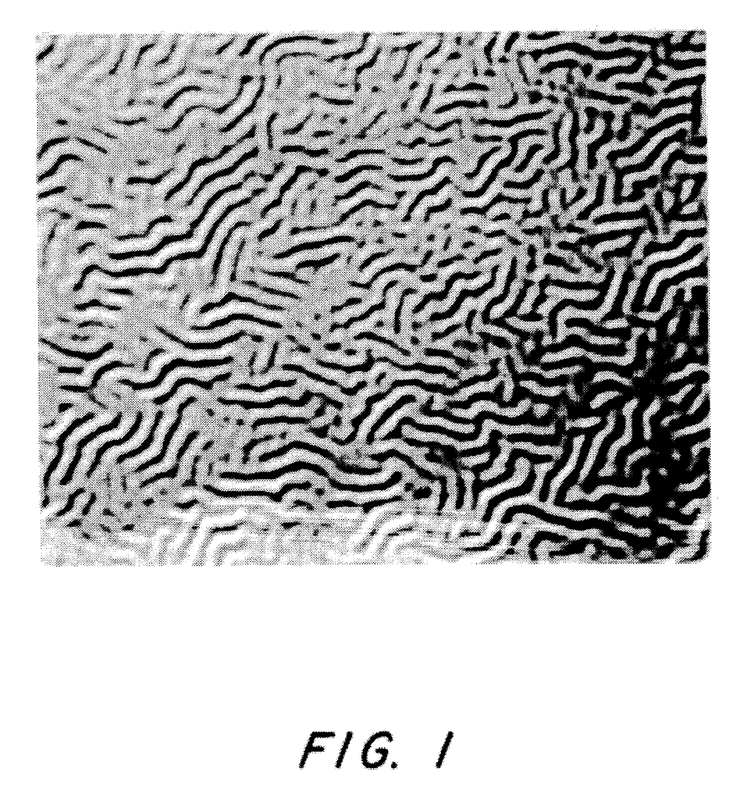
The drawing is a photomicrograph at 40× magnification of a cured surface of the low gloss coating of the present invention showing the uniformly wrinkled surface.

Coatings produced in accordance with the present invention exhibit a surface with very fine wrinkles, which are generally smaller than can be seen with the unaided eye. When viewed under magnification, the wrinkles can be seen to be uniformly distributed over the surface in a substantially regular pattern as shown in the drawing. This finely wrinkled surface appears to be responsible for the low gloss attained by the present invention without reliance on flatting agents. Gloss may conveniently be determined by the Standard Method of Test for Specular Gloss, ASTM Designation D-523-67 (Reapproval 1971). Using a Gardner 60° glossmeter, the gloss of cured coatings of the present invention can be less than 20 percent reflected light, preferably less than 10 percent reflected light, and some optimum embodiments have less than 6 percent reflected light.

BASE COMPOSITION A

The coating compositions of the examples which follow employed a base formulation which contained:

| Constituent | Parts by weight |
| --- | --- |
| Tripropylene glycol diacrylate | 153.78 |
| Cellulose acetate butyrate dispersant | 21.78 |
| Titanium dioxide | 250.22 |
| Calcium carbonate ("Hubercarb Q4") | 78.67 |

The above ingredients were ground with ceramic media in a pigment mill to a fineness of 6.5 on the Hegman scale. The grind was then flushed out of the mill with an additional 192 parts by weight of tripropylene glycol diacrylate. The composition was then let down with 345.33 parts by weight tripropylene glycol diacrylate, 8.8 parts by weight polyethylene wax ("Polymist B-6"), 28.0 parts by weight cellulose acetate butyrate, and the photoinitiators specified in the examples that follow.

EXAMPLE 1

This example compares the cure behavior of Base Composition A having a single photoinitiator added thereto with that of the same base composition having a combination of two photoinitiators added thereto in accordance with the present invention.

In the let down of the base composition of Example A was additionally included 10.93 parts by weight "DAROCUR 1173," an acetophenone derivative photoinitiator (2-hydroxy-2-methyl-1-phenyl propanone) from EM Chemicals, Elmsford, N.Y., USA. To one portion (Example 1A) of this composition no further additions were made. To another 400 part by weight portion (Example 1B) of the composition was further added 1.39 parts by weight "LUCIRIN TPO," an acylphosphine oxide photoinitiator (2,4,6-trimethyl benzoyl diphenyl phosphine oxide) from BASF Corporation. The compositions of Examples 1A and 1B were drawn down onto filled hardboard substrates by a drawing bar wound with 0.024 inch (0.6 millimeter) diameter wire.

Both coated substrates were cured by a three step process. The first step was exposure in air at 50 feet per minute (15 meters per minute) to 3 megarads of electron beam radiation at 250 kilovolts using a beam manufactured by Energy Sciences, Inc., of Woburn, Mass., USA. In the second step the coatings were exposed to ultraviolet radiation in an air atmosphere at a line speed of 40 feet per minute (12 meters per minute), using four lamps rated at 200 watts per inch (80 watts per centimeter) manufactured by Aetek International, Plainfield, Ill., USA. The third step was the same as the second step but an inert atmosphere (nitrogen with less than 500 parts by million O2) was maintained in the ultraviolet exposure chamber.

Example 1A cured to a relatively low gloss, finely wrinkled surface appearance, but the coating below the surface was uncured, permitting the cured skin layer to be readily peeled off with a fingernail. Because of the incomplete cure, a gloss measurement was not taken of Example 1A.

Example 1B cured to a low gloss finish having a 60° Gardener Glossmeter reading of 4.4% to 4.5% reflected light. The cure was complete as evidenced by passing 100 double rubs of acetone without rub-off and by the absence of mar from fingernail pressure.

EXAMPLE 2

A range of proportions of two photoinitiators in accordance with the present invention was tested by adding to 200 parts by weight of the base composition of Example A an acetophenone photoinitiator and an acylphosphine oxide photoinitiator in varying amounts as follows:

| | Parts by Weight Example: | | | | |
| --- | --- | --- | --- | --- | --- |
| Constituent | 2A | 2B | 2C | 2D | 2E |
| Composition of Example A | 200 | 200 | 200 | 200 | 200 |
| Acylphosphine oxide ("LUCIRIN TPO") | 0.68 | 1.36 | 2.03 | 1.36 | 0.68 |
| Acetophenone derivative ("DAROCUR 1173") | 2.03 | 2.03 | 2.03 | 4.06 | 4.06 |

Each of the above coating compositions was drawn down onto a hardboard substrate and cured in the same manner as described in Example 1. Examples 2A through 2E all yielded low gloss, fully cured films. However, Example 2A was particularly preferred for its excellent low gloss finish and feel. Examples 2C and 2D exhibited more gloss than the other examples in this group at angles higher than 60° from normal to the coated surface. The 60° Gardner glossmeter readings for the cured examples were:

| Example | Gloss (% reflected) |
| --- | --- |
| 2A | 4.4–4.6 |
| 2B | 4.6–4.7 |
| 2C | 5.5–5.9 |
| 2D | 4.9–5.2 |
| 2E | 4.6–4.7 |

EXAMPLE 3

The performance of a combination of photoinitiators not including acylphosphine oxide was tested with a composition identical to Example 2A except that 0.68 parts by weight "ITX" 2-isopropyl-thioxanthone photoinitiator from First Chemical Corporation, Pascagoula, Miss. USA, was used in place of the "LUCIRIN TPO" acylphosphine oxide photoinitiator. The coating was applied and cured in the same manner as in Example 1. The cured coating was fully cured and had a low gloss finish, with a 60° glossmeter reading of 4.9 to 5.0%. However, the curing process had caused the coating to become severely yellowed.

EXAMPLE 4

Clear coating compositions containing a combination of photoinitiators, one with no coloring pigment or flatting agent, the other with flatting agent only, were tested. The compositions were as follows, the ingredients being added in the order given:

| | Parts by weight | |
|---|---|---|
| Constituent | Example 4A | Example 4B |
| Tripropylene glycol diacrylate | 126.89 | 126.89 |
| Cellulose acetate butyrate | 25.56 | 25.56 |
| Tripropylene glycol diacrylate | 218.67 | 218.67 |
| "POLYMIST" polyethylene wax | 4.4 | 4.4 |
| Flatting silica* | 0 | 30.0 |
| Acylphosphine oxide ("LUCIRIN TPO") | 0.68 | 1.36 |
| Acetophenone derivative ("DAROCUR 1173") | 2.03 | 2.03 |
| Cellulose acetate butyrate (to adjust viscosity) | 8.0 | 0 |

*"OK412" flatting silica from Degussa.

The compositions of Examples 4A and 4B were drawn down onto a filled hardboard using a drawbar wound with a 0.032 inch (0.8 millimeter) diameter wire and cured in the same manner as in Example 1. The coating of Example 4A cured fully, but exhibited a relatively high gloss of 70 to 72% measured by a 60° glossmeter. The coating of Example 4B cured fully and had a low gloss appearance, with a 60° glossmeter reading of 4.4 to 4.7%. The low gloss effect of Example 4B is substantially greater than is attributable to the presence of the flatting agent. These results indicate that the present invention is applicable to clear coatings as well as colored coatings, provided that there is some pigment component present such as a flatting agent. Therefore, "pigmented" as used herein is intended to encompass transparent flatting agents such as silica.

EXAMPLE 5

In order to demonstrate that the invention is applicable to colors other than white, the following coating compositions were tested with black (Example 5A), red (Example 5B), and blue (Example 5C) pigmentation.

| | Parts by weight | | |
|---|---|---|---|
| Constituent | Example 5A | Example 5B | Example 5C |
| Tripropylene glycol diacrylate | 153.78 | 153.78 | 220.78 |
| Cellulose acetate butyrate | 10.0 | 10.0 | 10.0 |
| Lampblack | 25.0 | | |
| Red pigment[1] | | 60.0 | |
| Blue pigment[2] | | | 60.0 |

[1]"NOVOPERM RED 13-3059 F3RK-70" from Hoechst.
[2]"PHTHALO BLUE 248-3361" copper phthalo cyanine pigment from Sun Chemical Co.

The above compositions were each ground with ceramic media in a pigment mill to a fineness of 6.5 on the Hegman scale. The grind of Examples 5A and 5B were each then flushed out of the mill with an additional 192 parts by weight of tripropylene glycol diacrylate. Example 5C was flushed out of the mill with 125 parts by weight of tripropylene glycol diacrylate. Each composition was then let down with 345.33 parts by weight tripropylene glycol diacrylate, 8.8 parts by weight polyethylene wax ("POLYMIST B-6"), and 39.78 parts by weight cellulose acetate butyrate. Into 200 parts by weight of each of these compositions were blended 0.68 parts by weight of "LUCIRIN TPO" acylphosphine oxide photoinitiator and 2.03 parts by weight of "DAROCUR 1173" acetophenone derivative photoinitiator. The compositions of Examples 5A, 5B, and 5C were drawn down onto filled hardboard substrates by a drawing bar wound with 0.032 inch (0.8 millimeter) diameter wire and cured in the same manner as described in Example 1. The Gardner 60° glossmeter readings for the cured examples were:

| Example: | 5A | 5B | 5C |
|---|---|---|---|
| Gloss (% reflected) | 15–17 | 3.5–3.8 | 2.2–2.4 |

Although the gloss for the black coating of Example 5A was not as low as may be desired, it was substantially lower than would be attributed to the present of the black pigment itself, It was evident that larger amounts of black pigment would yield even lower gloss. Excellent low gloss coatings were achieved with the red and blue compositions of Examples 5B and 5C.

The following series of examples demonstrates the effect of molecular weight, and thus the viscosity, of the resin binder in the compositions of the present invention.

BASE COMPOSITION B

A coating composition exemplifying the present invention was formulated as follows and used as a standard against which the other examples were compared.

| Constituent | Parts by weight |
|---|---|
| Tripropylene glycol diacrylate | 76.89 |
| Cellulose acetate butyrate dispersant | 10.89 |
| Titanium dioxide | 125.11 |
| Calcium carbonate ("HUBERCARB Q4") | 39.34 |

The above ingredients were ground with ceramic media in a pigment mill to a fineness of 6.5 on the Hegman scale. The grind was then flushed out of the mill with an additional 96.0 parts by weight of tripropylene glycol diacrylate. The composition was then let down with 172.67 parts by weight tripropylene glycol diacrylate, 4.4 parts by weight polyethylene wax ("POLYMIST B-6"), 14.0 parts by weight cellulose acetate butyrate, and the following photoinitiators: 1.83 parts by weight "LUCIRIN TPO" acylphosphine oxide photoinitiator (2,4,6-trimethyl benzoyl diphenyl phosphine oxide) from Corporation, and 5.47 parts by weight "DAROCUR 1173," an acetophenone derivative photoinitiator (2-hydroxy-2-methyl-1-phenyl propanone) from EM Chemicals, Elmsford, N. Y., USA.

EXAMPLE 6

This example was the same as base composition B except that the cellulose acetate butyrate was replaced with an equal amount of an acrylated acrylate resin ("EBECRYL® 1701" from UCB Radure, Inc., Smyrna, Ga., USA). The acrylated acrylate resin is reported by its manufacturer as having a theoretical molecular weight of 27,000.

EXAMPLE 7

This example was the same as base composition B except that no cellulose acetate butyrate was included, and the tripropylene glycol diacrylate was replaced with an equal amount of a higher molecular weight polyethylene glycol diacrylate ("SARTOMER 344 Monomer" from Sartomer Company, West Chester, Pa., USA) having a nominal molecular weight of 400.

EXAMPLE 8

This example included the higher molecular weight polyethylene glycol diacrylate in the same amount as in Example 7 but the formula additionally contained some cellulose acetate butyrate (5.44 parts by weight). The amounts of the other components were the same as in Example 8.

EVALUATION

The compositions of Examples 6 through 9 were each drawn down side-by-side with base composition B onto filled hardboard substrates by a drawing bar wound with 0.032 inch (0.8 millimeter) diameter wire. All of the coated substrates were cured by a three step process. The first step was exposure in air at 50 feet per minute (15 meters per minute) to 3 megarads of electron beam radiation at 250 kilovolts using a beam manufactured by Energy Sciences, Inc., of Woburn, Mass., USA. In the second step the coatings were exposed to ultraviolet radiation in an air atmosphere at a line speed of 40 feet per minute (12 meters per minute), using four lamps rated at 200 watts per inch (80 watts per centimeter) manufactured by Aetek International, Plainfield, Ill., USA. The third step was the same as the second step but an inert atmosphere (nitrogen with less than 500 parts by million $O_2$) was maintained in the ultraviolet exposure chamber. Gloss was measured using a 60° Gardener Glossmeter, and the results are expressed as percent of reflected light. Low percentages of reflected light are indicative of attainment of the objectives of the present invention.

TABLE 1

|  | Resin Type | Resin MW | Viscosity 6 rpm/ 60 rpm | Wrinkle | Gloss (%) |
| --- | --- | --- | --- | --- | --- |
| Base Composition B | TPGDA & CAB | 300 30,000 | 600/550 | Yes | 4.2–4.4 |
| Example 6 | TPGDA & Acrylated acrylate | 300 27,000 | 100/60 | Some, uneven | 7.5–7.7 |
| Example 7 | PEG 400 DA | 508 | 2600/620 | No | 37–39 |

TABLE 1-continued

|  | Resin Type | Resin MW | Viscosity 6 rpm/ 60 rpm | Wrinkle | Gloss (%) |
| --- | --- | --- | --- | --- | --- |
| Example 8 | PEG 400 DA & CAB | 508 30,000 | 400/430 | No | 36–37 |

In the table, TPGDA is tripropylene glycol diacrylate, CAB is cellulose acetate butyrate, acrylated acrylate is "EBECRYL 1701", and PEG 400 DA is polyethylene glycol diacrylate. Molecular weights are determined by gel permeation chromatography using a polystrene standard unless specifically noted otherwise.

The invention has been disclosed in connection with specific embodiments in order to provide the best mode of the invention, but it should be understood that other variations and modifications as would be known to those of skill in the art can be resorted to within the scope of the invention as defined by the claims which follow.

We claim:

1. A pigmented, radiation curable coating composition adapted to produce a low gloss film, comprising:
   (a) a binder resin curable by radiation exposure in the presence of at least one photoinitiator compound, wherein
      (i) at least 90% by weight of the binder resin consists essentially of compounds selected from those whose curing by radiation exposure is substantially inhibited by the presence of oxygen,
      (ii) the binder resin is characterized by an average molecular weight less than 400 and an average crosslinking functionality less than 3.0,
      (iii) the binder resin does not contain substantial amounts of epoxy acrylate derivatives or allyl groups, and
      (iv) at least 10 weight percent of the binder resin is a polyacrylyloxy compound;
   (b) a first photoinitiator compound comprising an acylphosphine oxide;
   (c) a second photoinitiator compound comprising a substituted acetophenone derivative, wherein the weight ratio of the first photoinitator compound to the second photoinitiator compound ranges from between 0.05:1 to 1:1; and
   (d) pigment.

2. The composition of claim 1 comprising:
   10–99 weight percent of the binder resin;
   at least 0.01 weight percent of the acylphosphine oxide photoinitiator;
   0.01–4 weight percent of the second photoinitiator; and
   0.1–70 weight percent of the pigment.

3. The composition of claim 1 comprising:
   50–99 weight percent of the binder resin;
   at least 0.1 percent of the acylphosphine oxide photoinitiator;
   at least 0.1 percent of the second photoinitiator; and
   0.5–50 weight percent of the pigment.

4. The composition of claim 1 comprising:
   0.3–7 weight percent of the acylphosphine oxide photoinitiator; and
   0.5–2 weight percent of the second photoinitiator.

5. The composition of claim 1 wherein the weight ratio of the acylphosphine oxide photoinitiator to the second photoinitiator is from 0.1:1 to 0.5:1.

6. The composition of claim 1 wherein essentially all of the resin comprising the binder is characterized by average molecular weight less than 400 and average crosslinking functionality less than 3.0.

7. The composition of claim 1 wherein at least 30 percent by weight of the binder resin is polyacrylyloxy compound.

8. The composition of claim 1 wherein the pigment includes titanium dioxide.

9. The composition of claim 1 having no more than 15 percent by weight organic solvent.

10. The composition of claim 1 that is essentially free of organic solvent.

11. The composition of claim 1 wherein the binder is comprised of a resin characterized by an average molecular weight about 300.

* * * * *

UNITED STATES PATENT AND TRADEMARK OFFICE
CERTIFICATE OF CORRECTION

PATENT NO. : 5,585,415
DATED : December 17, 1996
INVENTOR(S) : Peter J. Gorzalski and David A. Diehl It is certified that error appears in the above-identified patent and that said Letters Patent is hereby corrected as shown below:

Claim 4, second line, delete "0.3-7" and insert --0.3-0.7--.

Signed and Sealed this

Eighth Day of April, 1997

*Attest:*

BRUCE LEHMAN

*Attesting Officer*  Commissioner of Patents and Trademarks